(No Model.)

L. R. OAKES.
SUPPORT FOR INCUBATOR THERMOMETERS.

No. 539,538. Patented May 21, 1895.

Witnesses:— John W. Dickson
James F. Morgan

Inventor:— Lucian R. Oakes

UNITED STATES PATENT OFFICE.

LUCIAN R. OAKES, OF BLOOMINGTON, INDIANA.

SUPPORT FOR INCUBATOR-THERMOMETERS.

SPECIFICATION forming part of Letters Patent No. 539,538, dated May 21, 1895.

Application filed January 11, 1895. Serial No. 534,543. (No model.)

*To all whom it may concern:*

Be it known that I, LUCIAN R. OAKES, a citizen of the United States, residing in the city of Bloomington, Monroe county, Indiana, have invented certain new and useful Improvements in Supports for Incubator-Thermometers; and I do hereby declare the following to be a full, clear, and exact description of my invention, such as will enable others skilled in the art to which it appertains to make and use the same, reference being had to the accompanying drawings, and to letters and figures of reference marked thereon, which form a part of this specification.

My invention relates to certain new and useful improvements in supports for incubator thermometers and possesses the following useful features, to wit:

First. The support for the bulb end of the thermometer consists of two sets, easily interchangeable with each other, one for use before pipping begins, and the other afterward.

Second. The elevation of the thermometer above the floor of the egg tray is readily increased or diminished by pressing the two legs of either pair nearer together or farther apart. It is thus adapted for use with eggs of different sizes.

Third. By the support as used before pipping begins, the bulb of the thermometer is held continually against the egg at any desired point of elevation on the upper hemisphere thereof, and thus shows the temperature of the egg at such point of elevation and not of the surrounding atmosphere which may vary materially therefrom. The same result is obtained regardless of the size of the egg upon which it rests. Supports heretofore in use rest upon the egg, touching it at more than one point or as a band around the upper part thereof, and if the egg is not of size to fit or if slightly moved, the bulb does not rest upon, or is removed from, the surface of the egg, and consequently fails to show the temperature thereof.

The accompanying drawings show all the features, and illustrate my invention.

Figures 1, 2, 3:
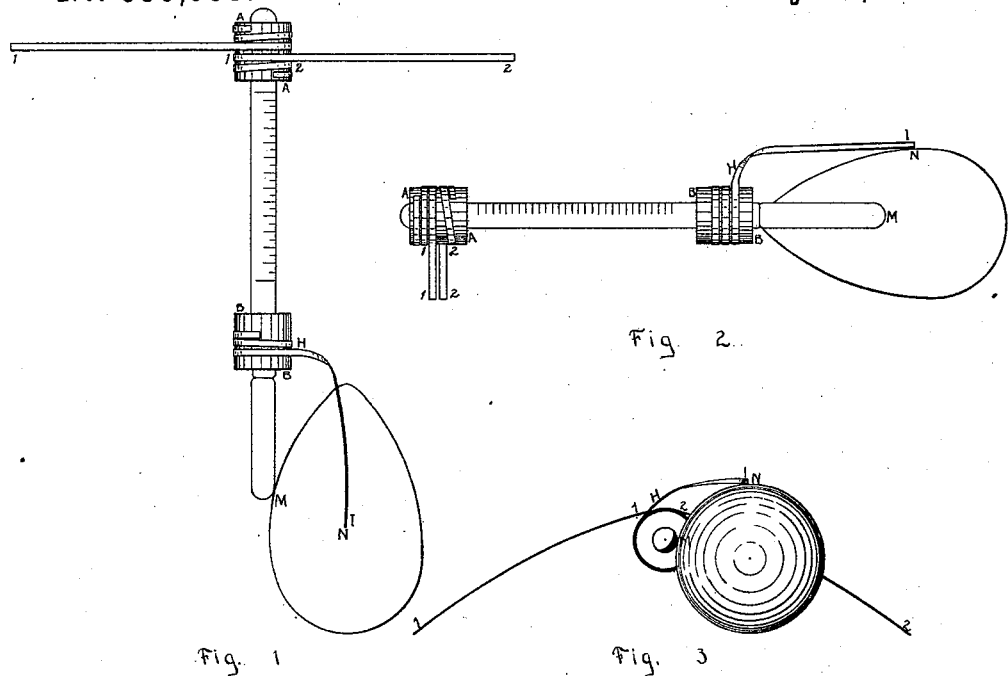
Figures 4, 5, 6:
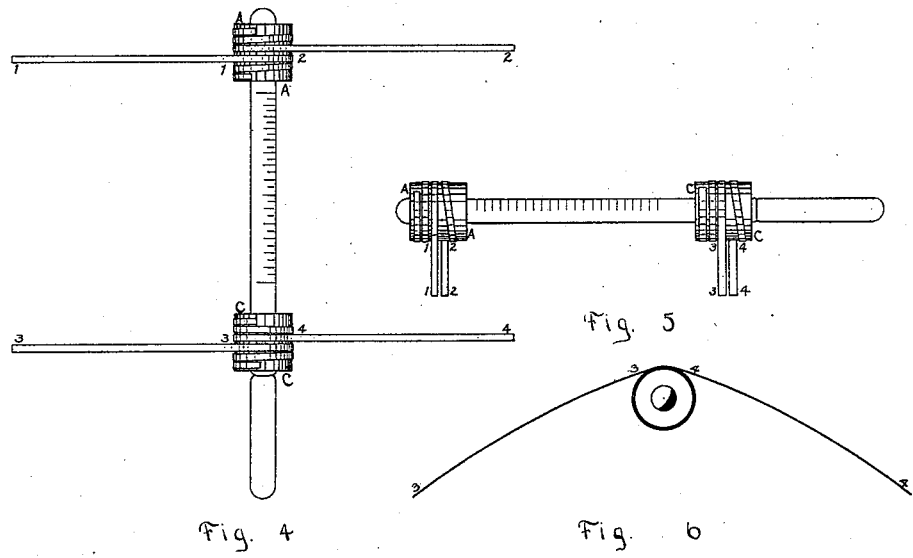

Figure 1 is a view from above and shows the supports as used before pipping begins. Fig. 2 is a side view of the same; and Fig. 3, an end view, looking toward the bulb. Fig. 4 is a view from above, showing supports as used after pipping begins. Fig. 5 is a side view of same; and Fig. 6, an end view, looking toward the bulb.

The same letters and figures refer to the same parts in the several views.

The support used before pipping begins (Figs. 1, 2 and 3) is constructed as follows: Two pieces of cork or other suitable material, cylindrical in form, each about five eighths of an inch in length and in diameter, indicated by A and B in the drawings, are each perforated along the axis by an opening or hole, large enough to receive the stem of the thermometer, tightly. To cork piece A, the legs 1 and 2 are attached, and to cork piece B is attached the arm H'. This arm and each of the legs are made of a piece of spring wire. One end of each piece is bent into a circular coil of sufficient diameter to pass tightly onto and around the cork pieces. The legs are each about three and one half inches in length from the coil to the lower or free ends thereof, and slightly curved along their entire length toward each other when placed upon the cork piece A. The arm H' is about two and one half inches in length from the coil to the free end thereof, and when attached to cork piece B by means of the coil it extends in a regular curve toward the line of the axis of the cork piece terminating about one inch from said line and describes about three eighths of the circumference of a circle having the line of the axis of the cork piece on one of its diameters. Cork piece B, bearing the arm H' is slipped onto the stem of the thermometer which fits tightly into the hole along the axis thereof, to a point near the bulb. Then cork piece A bearing legs 1 and 2 is slipped onto the stem in a similar manner resting near the end thereof opposite the bulb. The coil fastenings of the legs and arm slip on the cork pieces under slight pressure.

The desired elevation of the stem end of the thermometer is secured by pressing the legs nearer together or farther apart as the operator wishes to elevate or lower the same.

The arm H' and the bulb form a tong-like fork resting upon the egg and touching it at only two points indicated by M and N. The end of the arm may be elevated or lowered with reference to the bulb by slightly turning the cork piece A on the stem. In this way the bulb may be made to rest at any point of elevation upon the upper part of the egg. When the end of the arm is thrown upward the bulb rests lower on the egg and vice versa. The two legs 1 and 2 resting firmly upon the floor of the tray hold the arm and bulb in position as against any necessary movement of the tray.

The support as used after pipping begins (see Figs. 4, 5 and 6) is constructed by substituting for cork piece B bearing the arm H' in Figs. 1, 2 and 3, cork piece C bearing legs 3 and 4, which is exactly similar in all its parts to cork piece B bearing legs 1 and 2. When this substitution is made and the desired elevation of the thermometer secured by adjusting the legs in manner hereinbefore described, the thermometer rests firmly upon four legs and is secured against being thrown down or soiled by the chicks.

The substitution of cork piece C bearing legs 3 and 4 for cork piece B bearing the arm H' is made at the time pipping begins, as the chicks on escaping from the shell would throw the thermometer from its rest as shown in Figs. 1, 2 and 3, and the bulb end would fall to the floor of the tray.

The thermometer used in connection with this support consists of the bulb and straight stem suitably indexed.

What I claim, and desire to secure by Letters Patent, is—

1. The combination in an incubator thermometer mounted upon legs or supports, of legs adjustable by means of bands connected with their upper ends, which pass around and adhere to a cylinder attached to the thermometer, and which bands are movable around such cylinder by means of slight force applied against the legs, substantially as described.

2. The combination with an incubator thermometer supported at one end by legs and at the other end by an egg upon which it rests, of a removable leg, interchangeable with the arm or fastening which holds the thermometer upon the egg, the removable leg and arm or fastening attached to bodies having holes through them into and through which the stem of the thermometer is inserted and extracted substantially as described.

3. The combination with an incubator thermometer supported at the stem end by legs and resting upon the egg at its bulb end, of an arm supporter extending from its attachment to the stem of the thermometer near the bulb outward and horizontally therefrom and curved inward toward the bulb and terminating at a point about one inch from one side thereof and forming in connection therewith a fork or tongs, the two points of which rest upon the egg at opposite points near the top, substantially as described.

In testimony whereof I have hereunto affixed my signature in the presence of two witnesses.

LUCIAN R. OAKES.

Witnesses:
JAMES F. MORGAN,
JOHN W. DICKSON.